Dec. 1, 1964    E. SCHLUETER    3,158,917
FLANGE CLAMP
Filed March 16, 1962
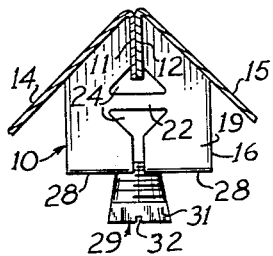
Fig. 1
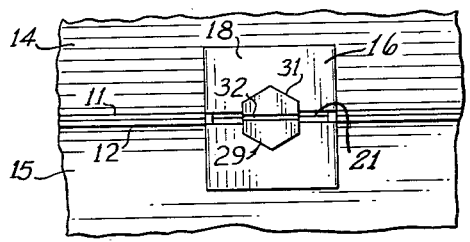
Fig. 2
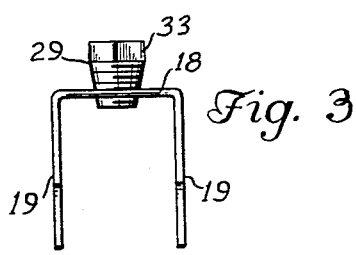
Fig. 3
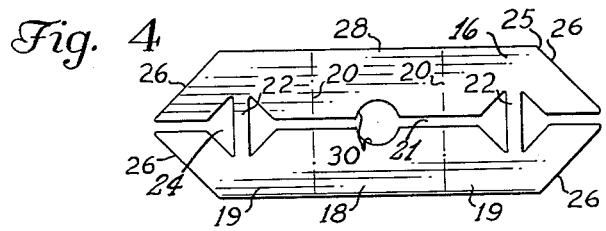
Fig. 4
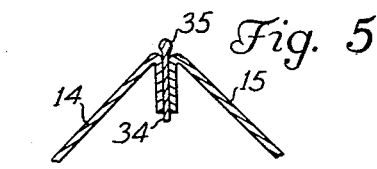
Fig. 5
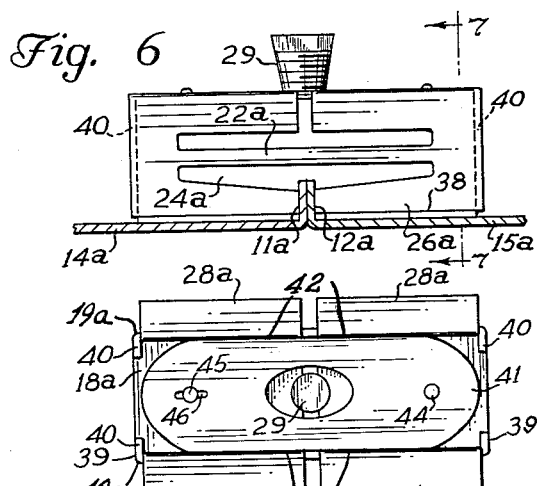
Fig. 6
Fig. 8
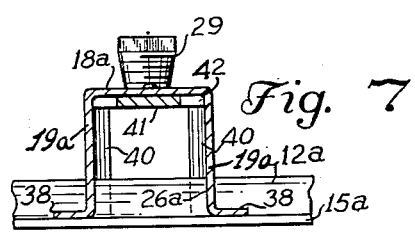
Fig. 7
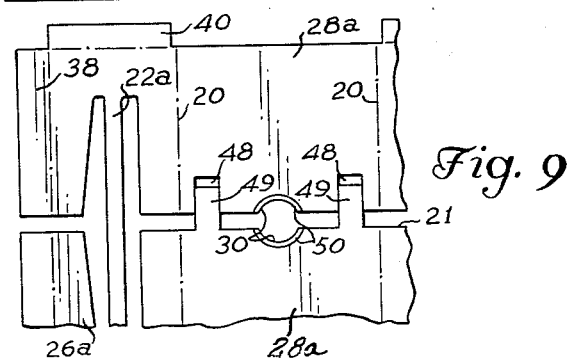
Fig. 9
INVENTOR.
Ernest Schlueter
BY
F. R. Jenkins
AGENT United States Patent Office 3,158,917
Patented Dec. 1, 1964

3,158,917
FLANGE CLAMP
Ernest Schlueter, 74 Edwards Road, Troy, N.Y.
Filed Mar. 16, 1962, Ser. No. 180,243
9 Claims. (Cl. 24—243)

This invention relates to flange clamps and more particularly to clamps adapted to the clamping of relatively thin or light flanges on sheet material, though the invention is not so limited and may be used to clamp two or more sheets of material together when the sheets or flanges can be disposed so close together that little movement of the clamp is required to secure the two together.

An object of the invention is to provide a clamp wherein the jaws are of one integral piece of sheet stock.

Another object is to provide a clamp which can be easily made by simple stamping process.

Another object is to provide a clamp especially adaptable for use in corners and is so shaped to provide reenforcement to sheet metal at a corner.

Another object is to provide a clamp from stamped sheet stock and yet be altered to smaller jaw openings independently of normal take-up means.

The attainment of these and other objects is reached in the invention which, briefly stated, includes a generally one-piece U-shaped clamping member of stamped sheet material having a continuous medial slit, except for two tying or stiff hinging portions tying the resulting two halves together. The slit is continuous across the yoke of the body with the tying portions in the mid portion of the respective branches, each branch forming a pair of jaws.

A tapered screw is threaded in between said two halves in the yoke portion to spread same to pivot about the tying portions and close the jaws.

In the accompanying drawing showing, by way of example, several of many possible embodiments of the invention, FIG. 1 is a side view of the clamp in clamping position shown in engagement with flanges at a corner of two joined sheets;

FIG. 2 is a plan of the clamp in FIG. 1;

FIG. 3 is an end view of the clamp;

FIG. 4 shows a blank from which the clamp is made;

FIG. 5 shows another form of corner for engagement by the clamp;

FIG. 6 is a side view of a modification of the clamp joining flanged co-planar sheets;

FIG. 7 is a sectional view of the clamp of FIG. 6, the section being taken substantially along the line 7—7 of FIG. 6 looking in the direction of the arrows of said line;

FIG. 8 is a bottom view of the clamp of FIG. 6, and

FIG. 9 is a fragmental view of a blank for forming another form of the clamp of FIG. 6.

The invention as shown in FIG. 1 is for use where a clamp 10 engages adjacent flanges 11 and 12 of sheets 14 and 15, with at least one of the flanges making an acute angle with its sheet. The most usual situation wherein these conditions occur is in the clamping of sheets or panels at a right angle corner, as shown, with each flange making a 45° angle with its sheet body.

The clamp 10 comprises a yoked body 16, preferably made from a flat stamping of generally elongated hexagonal shape with opposite substantially right angle corners as shown in FIG. 4, having a mid-portion 18 forming a yoke of the body as in FIG. 3. Parallel branches 19 of the body extend from the yoke as in FIG. 3 and are produced by bending the stamping at transverse lines 20. However the branches need not be parallel and the midportion may substantially merge with the branches, in which case the body becomes more in the shape of an inverted V rather than of a U. The corners of the blank would then be sharper than right angles. The body is provided with a medial longitudinal slit 21 which extends, with the exception of portions 22 in the branches 19 to serve as tie-parts, from end to end through the yoke. The width of the slit 21 is preferably constant except near the tie-parts 22 and approximately equal to, or greater than, the thickness of the two flanges 11 and 12, or whatever is to be clamped together.

The tie-parts 22 act as distortable tension members holding resulting body halves together. In order, preferably, to spread the distortion of the tie-parts 22 or members over a greater length, the slit is widened adjacent the tie-parts to increase the length thereof and this widening is of triangular shape as at 24 on each side of the tie-part. The slit in the outer end portions 25 of the legs 19 forms jaws 26 between which the flanges are received. The slit may be of different width between the two tie-parts 22 from its width betwen the jaws 26.

Usually the body 16 is symmetrical, longitudinally and transversely, about the central point of the yoke 18. The material of the body usually depends on the load it is to bear, the spacing of the clamps, the length of the tieparts 22 and the amount of distortion of such parts to tighten the jaws after they engage the flanges. For ordinary light work, $1/16$ inch thick sheet aluminum with the tie-parts about $1/2$ inch long and $1/8$ inch wide midway of a branch 19 of $1\frac{1}{4}$ inch length is satisfactory when the yoke is about 1 inch square. This provides sufficient rigidity to the body so that it may retain its shape in ordinary handling and use without wilful deformation.

The jaws 26 are forced against the flanges by a spreading of the two halves 28 of the yoke 18 by means of tapered screw 29 received in a pair of nearly semi-circular opposite recesses 30 in the central part of the yoke and in the respective halves 28. The marginal portions of the recesses may be offset in thread-like manner. A stud provided with pipe threads may be used instead of the tapered screw. The screw is provided with tool engageable portions at the head 33 thereof such as hex faces 31 or a slot 32.

Normally the screw 29 is snugly held in the recesses 30 when the clamp is not in use so that there is no danger of accidental separation of the screw and body. The clamp may then be inserted in a corner of flanged material as shown in FIG. 1 and the screw turned tight. Even with the clamp of aluminum as described in detail above, the clamp can be reused a large number of times. If the jaws 26 are not normally produced far enough apart so that with the screw snugly in the recesses 30 the jaws cannot be passed over the flanges, the screw may be partially backed out and the yoke halves 28 forced together with a pair of pliers or the like and a certain degree of set distortion imparted to the tie-parts so that the jaws must receive the flanges. If the body is of sheet steel, pounding the yoke halves together will effect a similar result.

Of course several layers of flange or strip material may be clamped, such as a strip 34 having an edge bead 35 between the flanges as in FIG. 5.

While the clamp as in FIG. 1 is admirably suited to use in a corner in that jaws may grip the flanges and the jaws may abut against the sheets 14 and 15 to give backing to same and to reduce kinking of the flanges while the screw is being tightened, the invention is not so limited, and a modification is shown in FIG. 6.

The modification of the clamp shown in FIG. 6 is basically much the same as that shown in FIG. 1 except that it is often more suitable for clamping together co-planar panel members 14a and 15a having right angle flanges 11a and 12a. Since the problem of holding the clamp and screw against relative turning is not usually as difficult when the panels are monoplanar as they are at corners, the jaws 26a may lie along against the panels in approximately the same line or plane and for a considerable distance. This means that the blank of FIG. 4 may become not only squared off at the ends but much wider. The tie parts are greatly elongated as at 22a, with the adjoining spaces 24a without appreciable, if any, triangular shape as was preferred in FIG. 1. The long tie parts enable the preferable use of steel for the material since the force for deformation of the longer tie-part is proportionately less. The tendency for the longer jaws to bend is reduced by the provision of a right angle flange 38 on each jaw to lie against the panel such as 15a of FIG. 7 and provide increased backing for the panel. Bending at the ends 39 is substantially prevented by flanges 40. The screw 29 itself largely prevents relative off-setting of the yoke halves 28a in the direction perpendicular to the panels. However, especially when the yoke is not held at the zone of the screw during tightening, there is a tendency for the yoke halves to become laterally off-set. This, as well as vertical off-setting, can be prevented by a lining strip 41 (FIG. 8) engaging along the side branches 19a or legs at 42 and against the yoke. The strip is secured fast to one half as by a rivet 44, but allowing a little relative longitudinal movement with respect to the other half as by a slightly loose rivet 45 through an elongated hole 46 in the yoke half, or as shown, in the lining strip 41.

Alternatively, one of the yoke halves as shown in the blank of FIG. 9 may be provided with slots 48 extending in the direction transverse to the slit 21 and the mating half 28a provided with tongues 49 movable into and out from the slots 48, but remaining at least partially therein. The tongues may be slightly bent to insure this condition. In this form of the invention, the material of the yoke near the recesses 30 may be partially drawn and threaded as at 50 to reduce canting of the screw and vertically off-setting the yoke halves.

While several embodiments of the invention are herein illustrated and described, it will be apparent that other modifications obvious to those skilled in the art may be made.

The invention has for its several advantages, the simplicity of a two piece assembly (the form having the lining strip being only slightly more complicated) which may involve only a stamping and bending operation with final insertion of the screw. The jaws not only clamp the flanges of the sheet material, but afford abutment means for strengthening the sheet contiguous to the flanges thereof.

Tightening the screw imparts a pincer-like action on the sheet flanges so that the clamping is most effective almost at the plane of the sheets. At times, when panel pieces are slightly more separated than desired it is desirable for final fit for the clamp to bear on the outer edges of the flanges to get the sheets in approximate position. Repeated tightening and then loosening of the screw and pushing on the clamp usually enable the clamp to be pushed "home" for tightening.

While it is of course most desirable that the clamp be made to fit a given gauge flange, the clamps as shown can be somewhat altered to perform satisfactorily on thinner gauges, by kinking the tie-parts 22 and 22a. For example, the form of FIG. 1 may be slipped over a board having a hole to register under the tie-piece and the latter be given a light blow to give it a set to shorten its effective length. The clamp may be then turned over and the other tie-part shortened in the same manner. Of course the clamping action tends to straighten out the kink but with short tie pieces the tendency is slight.

When the tie piece is long as at 22a and the kink not so well localized so as to permit reverse kinking without good control, the tie pieces can be bowed inwardly toward each other, and held by suitable means such as a tie wire for instance. The end flanges 40 bear against the yoke parts 28a to prevent collapsing bending of the jaws toward each other. The amount of bending of the tie-parts retained by the wire, of course, determines the shortening of the tie-parts 22a.

The invention claimed is:

1. A clamp comprising a generally U-shaped body of slightly yieldable material and having legs and a yoke, the end portions of the legs being provided with open-end slots respectively dividing the legs into pairs of engagement jaws the yoke being provided with a generally longitudinal slot throughout its entire length, the slot of the yoke extending into the legs close to, but without meeting, said open-ended slots to leave tie portions in the respective legs to maintain integrity of the body but yieldable in pivot-like manner under force, and means in the slot of the yoke to spread the resulting halves of the yoke and contiguous portions of the legs and cause the pairs of jaws to close.

2. A clamp as claimed in claim 1, the widths of the slots being greater at the tie portions so as to lengthen the latter to facilitate their bending.

3. A clamp comprising a generally U-shaped body of slightly yieldable material having legs and a yoke and provided with substantially co-planar open-ended slots in the end portions of the respective legs to form pairs of jaws, the yoke having a slot therethrough generally in the plane of the open-ended slots and extending into the legs, thereby dividing a portion of the body into two halves, the slots being of lengths to leave a tie part in each leg yieldable under force so that spreading of the halves will cause the jaws to tend to close at the ends thereof, the respective tie parts being about the same distance from the mid-portion of said yoke, and a conical screw in the slot of said yoke and in substantially threaded engagement with the respective halves for spreading the same.

4. A clamp as claimed in claim 3, and means for preventing off-setting of the respective halves of the yoke when the screw is turned between the halves.

5. A clamp for mating 45° flanged sheets in corners, comprising a generally U-shaped body of bent sheet metal and having legs and a portion forming a yoke therebetween, the two end portions of the respective legs being provided with open-ended parallel medial slots of equal length to provide two pairs of jaws, each jaw having an outer edge making approximately 45° with the plane of the slots, said yoke having a slot therethrough substantially in said plane and extending into each of said legs near to but short of said medial slots to leave slightly yieldable metal tie parts for maintaining integrity of the body, said tie parts functioning as yieldable pivotal connections between the halves of the body on each side of the slots, and a conical screw in the yoke and in substantially threaded engagement with said halves for spreading same to cause closing of the jaws.

6. A clamp as claimed in claim 5, said screw having a head provided with a diametric slot, so that when the clamp is placed over flanges in a corner, a screw driver may be used to force the clamp further into the corner and at least two of the 45° edges of the jaws engage against material near the flange to hold the clamp against turning while the screw is being turned.

7. A clamp comprising a generally U-shaped body of slightly yieldable material and having legs and a yoke, the end portions of the legs being provided with open-end slots respectively dividing the legs into pairs of engagement jaws, the yoke being provided with a generally longitudinal slot throughout its entire length, the slot of the yoke extending into the legs close to, but without meeting, said open-ended slots to leave tie portions in the respective legs to maintain integrity of the body but yieldable in pivot-like manner under force, and means in the slot of the yoke to spread the resulting halves of the yoke and contiguous portions of the legs and cause the pairs of jaws to close, said jaws all being provided with flanges lying in a single plane when the jaws are in a substantially predetermined position for strengthening the jaws and to provide engagement faces for flanged sheet material when the jaws secure flanges provided on the sheet material.

8. A clamping device comprising a metal integral body generally U-shaped and having three slots to divide same into two halves of U shape except for two yieldable tying portions in the respective leg portions for pivots, a conically shaped screw in the yoke portion and engaging the two halves for spreading same in the yoke portion and closing said halves at the outer ends of the leg portions, and means on the yoke portion to prevent movement of the yoke portion halves in a direction at right angles to the direction of said spreading.

9. A device as claimed in claim 8, said means including the provision of an open-ended slot in one of said halves of the yoke portion and a tongue-like projection on the other half of the yoke portion and projecting into the open-ended slot.

References Cited in the file of this patent

UNITED STATES PATENTS

| | | |
|---|---|---|
| 2,498,610 | Squires | Feb. 21, 1950 |
| 2,745,155 | Collins | May 15, 1956 |

FOREIGN PATENTS

| | | |
|---|---|---|
| 817,170 | France | May 15, 1937 |